United States Patent
Sviberg (10) Patent No.: US 10,569,624 B2
(45) Date of Patent: Feb. 25, 2020

(54) MOTOR VEHICLE HAVING A ROOF OPENING

(71) Applicant: Webasto SE, Stockdorf (DE)

(72) Inventor: Magnus Sviberg, Stockdorf (DE)

(73) Assignee: Webasto SE, Stockdorf (DE)

( * ) Notice: Subject to any disclaimer, the term of this patent is extended or adjusted under 35 U.S.C. 154(b) by 14 days.

(21) Appl. No.: 16/056,757

(22) Filed: Aug. 7, 2018

(65) Prior Publication Data
US 2019/0047387 A1 Feb. 14, 2019

(30) Foreign Application Priority Data

Aug. 9, 2017 (DE) .................. 10 2017 118 149

(51) Int. Cl.
| | | |
|---|---|---|
| *B60P 3/34* | (2006.01) | |
| *B60J 7/16* | (2006.01) | |
| *B60J 7/02* | (2006.01) | |

(52) U.S. Cl.
CPC .................. *B60J 7/02* (2013.01); *B60J 7/165* (2013.01); *B60P 3/34* (2013.01)

(58) Field of Classification Search
CPC ........ B60J 7/165; B60J 7/1628; B60J 7/1635; B60P 3/34; B60P 3/341
USPC ........ 296/26.02, 26.04–26.07, 165, 172, 173
See application file for complete search history.

(56) References Cited

U.S. PATENT DOCUMENTS

| | | | |
|---|---|---|---|
| 1,871,871 A | | 8/1932 | Woods |
| 2,243,659 A * | | 5/1941 | Thompson ................ B60P 3/38 296/175 |
| 3,053,562 A * | | 9/1962 | Farber ...................... B60P 3/38 296/26.05 |
| 3,253,857 A * | | 5/1966 | Deisenroth ............... B60P 3/34 52/72 |
| 3,377,100 A * | | 4/1968 | Cripe ........................ B60P 3/34 296/176 |
| 3,582,130 A * | | 6/1971 | Borskey .................. B60J 7/165 296/176 |
| 3,770,314 A * | | 11/1973 | Borskey .................. B60J 7/165 296/176 |
| 3,802,732 A * | | 4/1974 | McKee .................. B60P 3/341 296/176 |

(Continued)

FOREIGN PATENT DOCUMENTS

DE 10 2004 005 589 A1 8/2005

*Primary Examiner* — Gregory A Blankenship
(74) *Attorney, Agent, or Firm* — Fitch, Even, Tabin and Flannery, LLP (57) ABSTRACT

A motor vehicle having a vehicle roof having a roof opening with fixed roof portions relative to the vehicle and a covering unit having at least one rigid roof element and that can be displaced between a lifted operating position compared to the roof portions fixed relative to the vehicle, and a lowered closed position, in which the at least one rigid roof element closes the roof opening. Stud elements supporting the covering unit in the operating position, are articulated to the covering unit to be pivotable. Each of the stud elements, in the operating position, spans a right angle together with a plane that is defined by the at least one rigid roof element so that the covering unit can be set down, on bases fixed relative to the vehicle. Additionally, the covering unit may have at least one securing element lock the stud elements in the operating position.

13 Claims, 7 Drawing Sheets

(56) References Cited

U.S. PATENT DOCUMENTS

| | | | | | |
|---|---|---|---|---|---|
| 3,819,223 | A | * | 6/1974 | Cobb | B60P 3/34 |
| | | | | | 296/26.05 |
| 4,174,133 | A | * | 11/1979 | Brockhaus | B60P 3/341 |
| | | | | | 296/210 |
| 4,210,360 | A | * | 7/1980 | Powers | B60J 7/047 |
| | | | | | 296/165 |
| 4,317,590 | A | * | 3/1982 | Young | B60J 7/165 |
| | | | | | 296/176 |
| 4,362,258 | A | * | 12/1982 | French | B60J 7/165 |
| | | | | | 224/309 |
| 5,002,329 | A | * | 3/1991 | Rafi-Zadeh | B60J 7/1614 |
| | | | | | 248/166 |
| 5,078,441 | A | * | 1/1992 | Borskey | B60J 7/165 |
| | | | | | 292/DIG. 72 |
| 5,735,565 | A | * | 4/1998 | Papai | B60P 3/34 |
| | | | | | 296/165 |
| 6,325,447 | B1 | * | 12/2001 | Kuo | B60P 3/341 |
| | | | | | 296/160 |
| 7,699,372 | B2 | * | 4/2010 | Adams | B60R 9/055 |
| | | | | | 224/324 |
| 9,604,564 | B1 | * | 3/2017 | Pellicer | B60P 3/34 |
| 2002/0135204 | A1 | * | 9/2002 | Okamoto | B60P 3/341 |
| | | | | | 296/165 |
| 2015/0292230 | A1 | * | 10/2015 | Park | E04H 15/06 |
| | | | | | 135/88.13 |
| 2019/0047387 | A1 | * | 2/2019 | Sviberg | B60J 7/165 |

* cited by examiner

MOTOR VEHICLE HAVING A ROOF OPENING

CROSS-REFERENCE TO RELATED APPLICATIONS

This application claims priority from German Patent Application Number DE 10 2017 118 149.0, filed Aug. 9, 2017, which is hereby incorporated herein by reference in its entirety for all purposes.

FIELD

The invention relates to a motor vehicle having a vehicle roof having the features of the preamble of claim 1.

BACKGROUND

Such a motor vehicle is known from DE 10 2004 005 589 A1 and comprises both a roof opening limited by roof portions that are fixed relative to the vehicle and a covering unit for covering the roof opening. The covering unit in turn comprises at least one rigid roof element. Additionally, the covering unit can be displaced between a lifted operating position, in which the at least one rigid roof element is in lifted position as compared to the roof portions that are fixed relative to the vehicle, and a lowered closed position, in which the at least one rigid roof element closes the roof opening. Stud elements, which support the covering unit in the operating position, are articulated to the covering unit so as to be pivotable.

SUMMARY

The object of the invention is to propose a motor vehicle with a vehicle roof that stands out due to a simple handling and an improved use of space and that can be retrofitted in a simple manner.

This object is attained by a motor vehicle having a vehicle roof, which comprises a roof opening limited by roof portions that are fixed relative to the vehicle and a covering unit that comprises at least one rigid roof element and that can be displaced between a lifted operating position, in which the at least one rigid roof element is in lifted position as compared to the roof portions that are fixed relative to the vehicle, and a lowered closed position, in which the at least one rigid roof element closes the roof opening, stud elements, which support the covering unit in the operating position, being articulated to the covering unit so as to be pivotable. Each of the stud elements, in the operating position, spans a substantially right angle together with a plane that is defined by the at least one rigid roof element so that the covering unit can be set down, in the manner of a table, on bases that are fixed relative to the vehicle. The covering unit comprises at least one securing element in order to lock the stud elements in the operating position.

Additionally, the pivotable stud elements lead to the covering unit taking up only a small installation space in its lowered closed position, whereby a large head clearance inside of a passenger compartment being below the covering unit can be guaranteed. When the covering unit is also arranged above a storage space, this provides for a large storage space.

By way of the proposed simple structure of the stud elements and of the at least one securing element, the covering unit can be displaced between its lifted operating position and its lowered closed position readily and in a simple manner.

Additionally, due to the fact that only a small installation space is needed and by way of the concept of the covering unit, it is not required anymore to change the car body when such a covering unit is installed subsequently.

In a preferred embodiment of the motor vehicle according to the invention, the securing element is a securing strut that is on the one hand articulated to the at least one rigid roof element and can on the other hand, via a securing connection, be connected to at least one of the stud elements so as to be detachable. In order to absorb forces, such as wind loads, which act on the covering unit in its operating position, in the best possible manner, the at least one securing strut is articulated to the rigid roof element. Thereby, a lever arm, which is formed by the stud element, is shorter than an arrangement at a roof portion that is fixed relative to the vehicle. Hence, the covering unit is realized so as to be stable and durable. Here, the securing strut can at least be displaced between a cleared position, in which it is out of engagement with the at least one stud element, and a securing position, in which it is connected to the at least one stud element via the securing connection.

In another preferred embodiment of the motor vehicle according to the invention, the covering unit can comprise three rigid roof elements. Preferably, said three rigid roof elements are arranged one behind the other in the longitudinal direction of the roof or in the direction of travel. Thereby, it is possible to separately uncover individual regions of a vehicle interior, such as the front seats, the rear row of seats or the loading space, by removing a corresponding rigid roof element to the top in the manner of a convertible vehicle. Simultaneously, the remaining parts can also be uncovered to the top or remain covered when the corresponding rigid roof element is not removed.

In another preferred embodiment of the motor vehicle according to the invention, the covering unit can comprise at least four stud elements, each stud element preferably being arranged in a separate corner region of the covering unit. The covering unit, in this embodiment, preferably has a largely rectangular footprint. Hence, the covering unit comprises, when viewed in the direction of travel, two front stud elements and two rear stud elements or two left stud elements and two right stud elements. The two front stud elements can for example support the covering unit in the region of A-pillars of the motor vehicle and the two rear stud elements can for example support the covering unit in the region of B-pillars, C-pillars or D-pillars. With such an arrangement, the stability of the covering unit is even better.

As an alternative or in addition, it is conceivable that the covering unit comprises at least four stud elements per rigid roof element, each stud element preferably being arranged in a separate corner region of the respective rigid roof element. The rigid roof element, in this embodiment, preferably has a largely rectangular footprint. Thereby, an individual rigid roof element can be displaced separately from other rigid roof elements. In this case, the lifted rigid roof element is in the operating position while the lowered rigid roof elements remain in the closed position.

A covering unit that can comprise four stud elements in separate corner regions and at least four more stud elements at a rigid roof element is also conceivable. Thereby, a cascade-like vehicle roof can be realized, with which not only the covering unit as such can be lifted as compared to the roof portions that are fixed relative to the vehicle, via its four stud elements, but also at least the one rigid roof element can be lifted via its four stud elements. In other words, the lifted rigid roof element can be lifted in two ways. It is also conceivable that only a single rigid roof element can be lifted using the four stud elements.

In another preferred embodiment of the motor vehicle according to the invention, the vehicle roof can include a roof opening seal that is arranged circumferentially at the edge of the vehicle roof on the side of the roof opening. The covering unit hence rests on the roof opening seal in its lowered closed position, whereby moisture is safely prevented from entering the vehicle interior.

Additionally, it is conceivable that the covering unit includes rigid roof element seals between adjacent rigid roof elements. Hereby, too, moisture is safely prevented from entering a vehicle interior.

In another preferred embodiment of the motor vehicle according to the invention, the vehicle roof comprises a curtain-like fabric jacket or sheathing that can be spanned between the at least one rigid roof element and the roof portions that are fixed relative to the vehicle. Thereby, even with an erected covering unit, a vehicle interior is largely protected from outside influences such as wind or rain and there is more privacy. It is conceivable that the height of the fabric jacket corresponds to the length of the stud elements so that the fabric jacket is stretched to the greatest possible extent while the covering unit is erected.

In another preferred embodiment of the motor vehicle according to the invention, the fabric jacket is on the one hand fastened in a groove of the at least one rigid roof element and on the other hand in a water channel of the car body. Thereby, a largest possible vehicle interior can be guaranteed.

It is conceivable that the pivot axes of the stud elements and/or of the at least one securing strut run in the transverse direction of the vehicle. Thereby, the stud elements can be very long, whereby a covering unit can be realized that can be lifted very high. For with an arrangement of the pivot axes in the longitudinal direction of the vehicle, the length of the stud elements would in particular strongly be limited by the width of the vehicle.

In another preferred embodiment of the motor vehicle according to the invention, the securing connection can be a plug-in connection, a clamp connection or a screw connection. Thereby, the covering unit can be secured and released without the use of tools and in a simple manner.

In another preferred embodiment of the motor vehicle according to the invention, one securing element is assigned to each stud element. Thereby, all stud elements are secured in the same way, which leads to a very stable covering unit. Additionally, forces acting on the covering unit hence do not cause unbalanced stress on the covering unit.

In another preferred embodiment of the motor vehicle according to the invention, the vehicle roof comprises at least one locking element for securing the covering unit at at least one roof portion that is fixed relative to the vehicle in the lowered closed position. Thereby, an unintentional clearing of the roof opening is safely precluded.

Further advantages and advantageous configurations of the subject-matter of the invention can be taken from the description, from the drawing and from the claims.

BRIEF DESCRIPTIONS OF THE DRAWING

In the drawing, an exemplary embodiment of a motor vehicle according to the invention is illustrated in a schematically simplified manner and will be explained in more detail in the following description.

DETAILED DESCRIPTION

Figure 1:
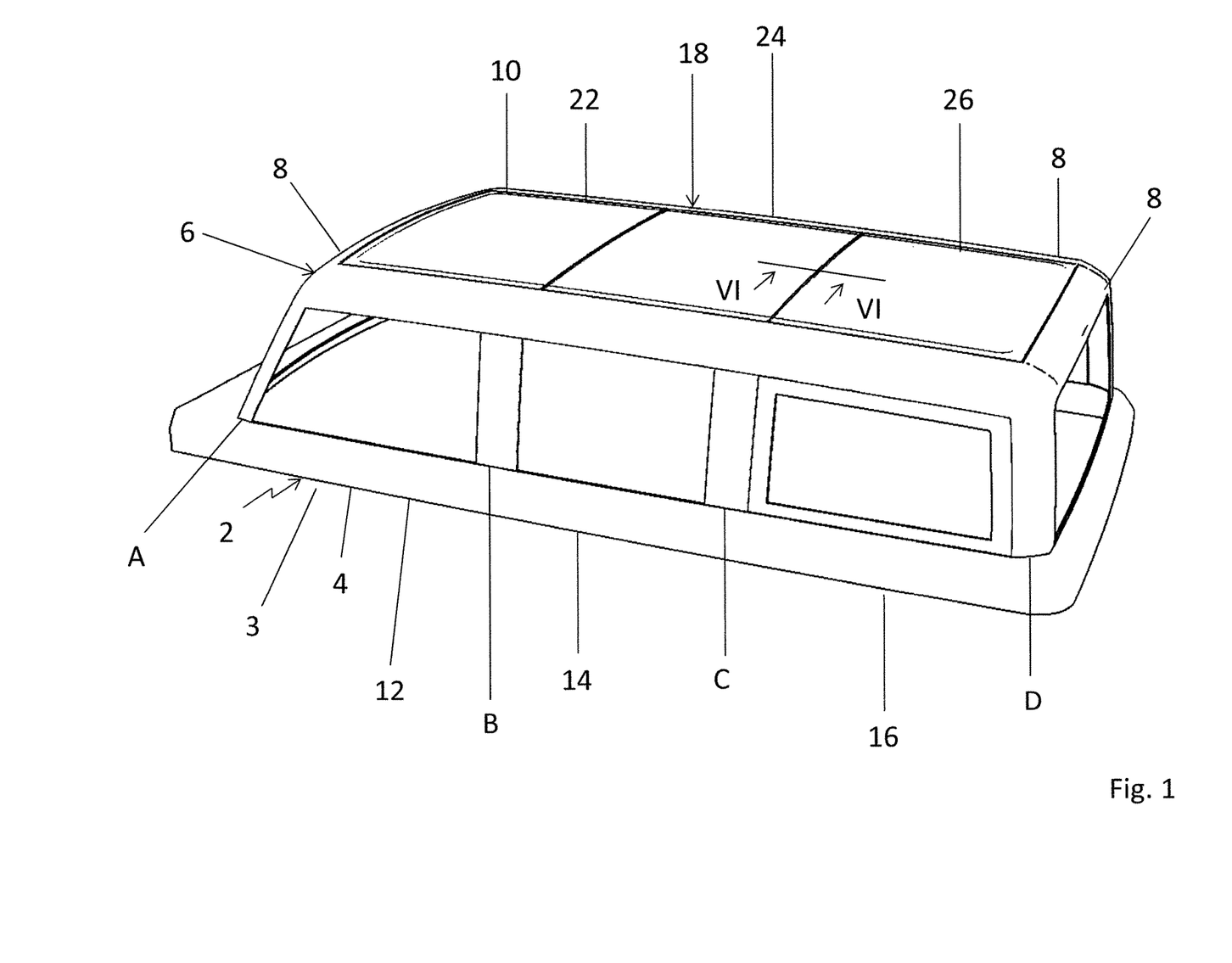
FIG. 1 shows a perspective top view onto a vehicle body of a vehicle according to the invention, having a covering unit in the closed position.
Figure 2:
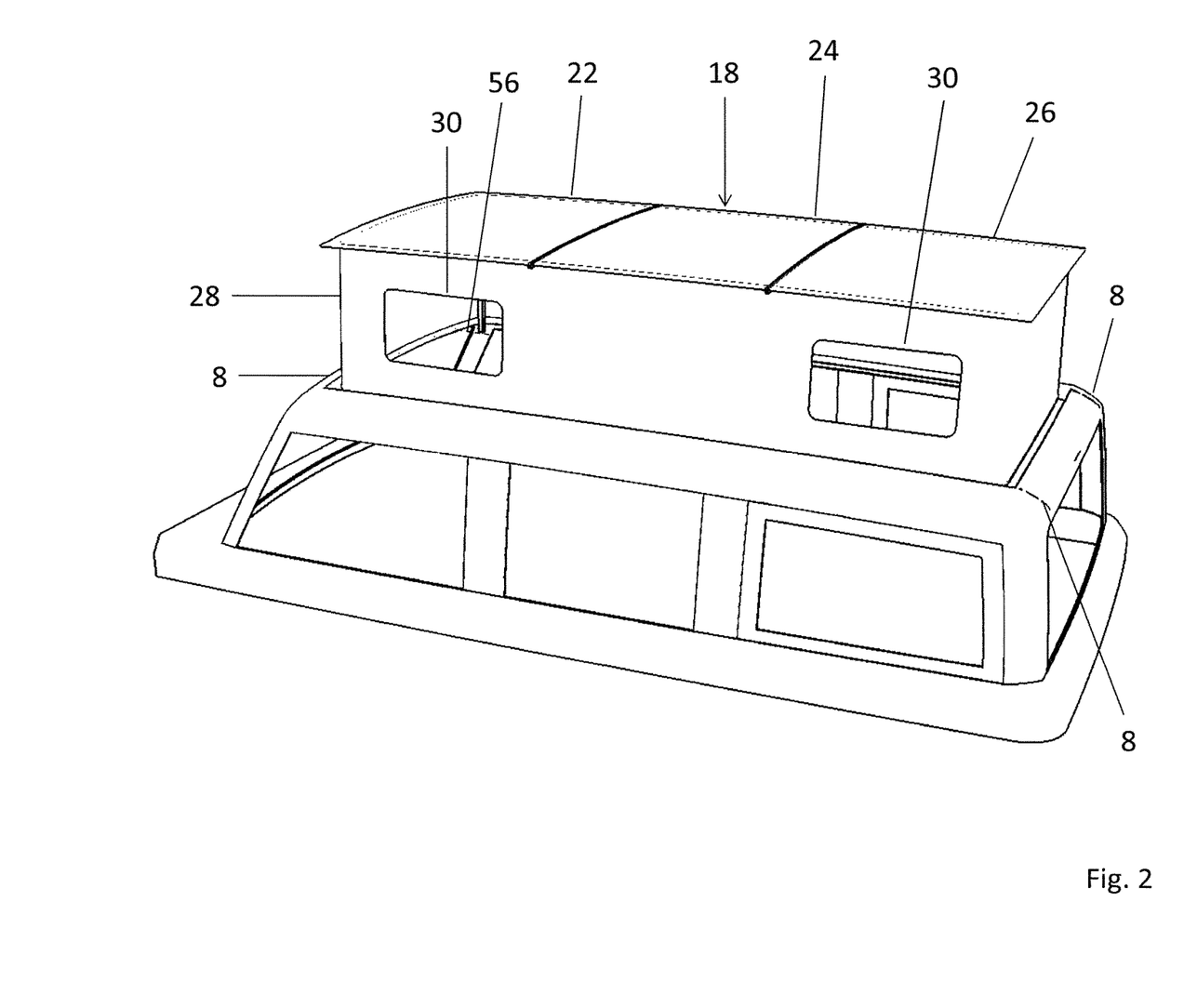
FIG. 2 shows a view corresponding to FIG. 1 with a lifted covering unit in its operating position.
Figure 3:
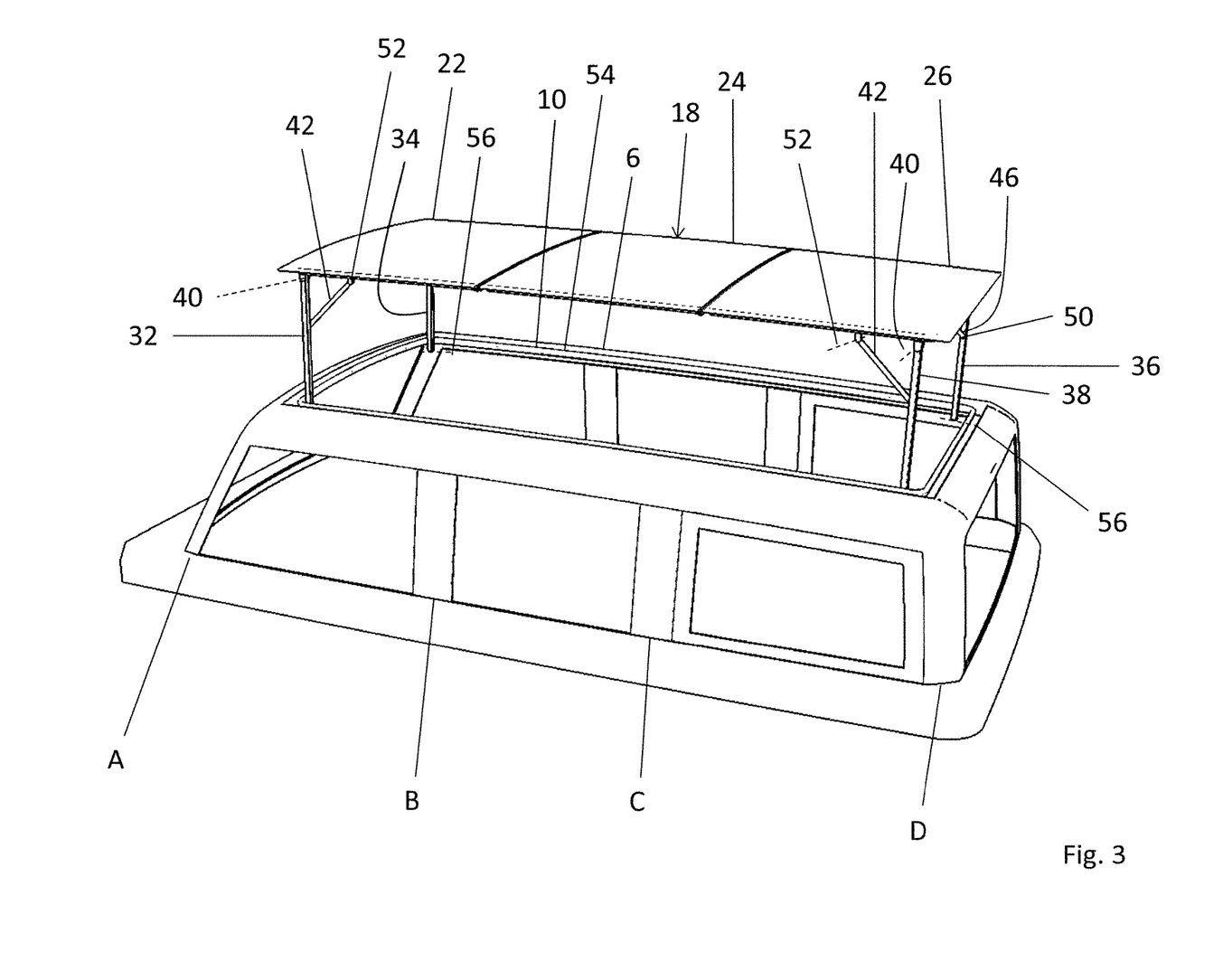
FIG. 3 shows a view corresponding to FIG. 2, the fabric jacket having been removed.

In FIGS. 1 to 3, a body 3 of a motor vehicle 2 above a shoulder line 4 is illustrated. The motor vehicle 2 includes a vehicle roof 6, which comprises roof portions 8 that are fixed relative to the vehicle and a roof opening 10, which is limited by the roof portions 8 that are fixed relative to the vehicle. The roof opening 10 extends in the longitudinal direction of the vehicle roof 6, hence above a front seat region 12, a rear bench seat region 14 and a storage compartment region 16. The vehicle interior is hence divided into three parts in the direction of travel, the front region in the direction of travel comprising two front seats, the rear bench seat region 14 adjoining the same towards the rear comprising a seat bench and the rear interior region including a storage compartment and is therefore called storage compartment region 16. The car body 3 includes an A-pillar A, a B-pillar B, a C-pillar C and a D-pillar D on each of the two sides of a vertical longitudinal center plane of the vehicle.

The roof opening 10 that is illustrated in FIG. 1 is closed using a covering unit 18. The covering unit 18 comprises three rigid roof elements 22, 24 and 26, which are each assigned to one of the three interior regions 12, 14 and 16. The covering unit 18 can be displaced between a lowered closed position, which is illustrated in FIG. 1, and a lifted operating position, which is illustrated in FIGS. 2 and 3, and in which the three rigid roof elements 22, 24 and 26 are in lifted position as compared to the roof portions 8 that are fixed relative to the vehicle, which means that the covering unit 18 is deployed.

The vehicle roof 6 comprises a curtain-like fabric jacket or sheathing 28, which is spanned between the rigid roof elements 22, 24 and 26 and the roof portions 8 that are fixed relative to the vehicle. The fabric jacket 28 can on the one hand be fasted in a groove 27 of the rigid roof elements 22, 24 and 26 and on the other hand in a water channel 80 of the car body on the side of the roof. In the fabric jacket 28, window-like viewing portions 30 are realized. The fabric jacket 28, on the side of the vehicle roof, follows the edge on the side of the roof opening of the vehicle roof 6 and therefore surrounds the roof opening 10 completely.

To illustrate the erection mechanism more precisely, FIG. 3 shows the covering unit 18 in its lifted operating position in accordance with FIG. 2; without the fabric jacket 28. Four stud elements 32, 34, 36 and 38 are articulated to the covering unit 18, each having a pivot axis 40 that runs in the transverse direction of the vehicle. Each stud element 32, 34, 36 and 38 is arranged in a separate corner region of the covering unit 18. The covering unit 18 includes a largely rectangular footprint. Hence, the covering unit comprises, when viewed in the forward direction of travel, two front stud elements 32 and 34 and two rear stud elements 36 and 38 or two left stud elements 32 and 38 and two right stud elements 34 and 36. The two front stud elements 32 and 34 support the covering unit 18 in the region of the A-pillars A of the motor vehicle 2 and the two rear stud elements 36 and 38 support the covering unit 18 in the region of the D-pillars D.

The stud elements 32, 34, 36 and 38 hence support the covering unit 18 in its operating position, the stud elements 32, 34, 36 and 38 in turn being supported on a base 56 that is fixed relative to the vehicle. In the operating position, each of the stud elements 32, 34, 36 and 38 spans a largely right angle together with a plane that is defined by the three rigid roof elements 22, 24, 26. Thereby, the covering unit 18 is deployed in the manner of a table, the stud elements 32, 34, 36 and 38 forming the table legs.

The covering unit 18 comprises four securing struts 42, 46 and 48, each securing strut 42, 46 and 48 being assigned to one stud element 32, 34, 36 and 38. Each securing strut 42, 46 and 48 is on the one hand articulated to one of the rigid roof elements 22 and 26 and is on the other hand, via a securing connection 50, connected to the corresponding stud element 32, 34, 36 or 38 so as to be detachable in order to lock the covering unit 18 in its operating position. On the side of the covering unit, the securing struts 42, 46 and 48 can each be pivoted about a pivot axis 52 running in the transverse direction of the vehicle.

The vehicle roof 6 comprises a roof opening seal 54, which is arranged circumferentially at the edge, on the side of the roof opening, of the roof portions 8 that are fixed relative to the vehicle. In the closed position, the covering unit 18 rests on the roof opening seal 54 with corresponding abutment surfaces.

Figure 4:
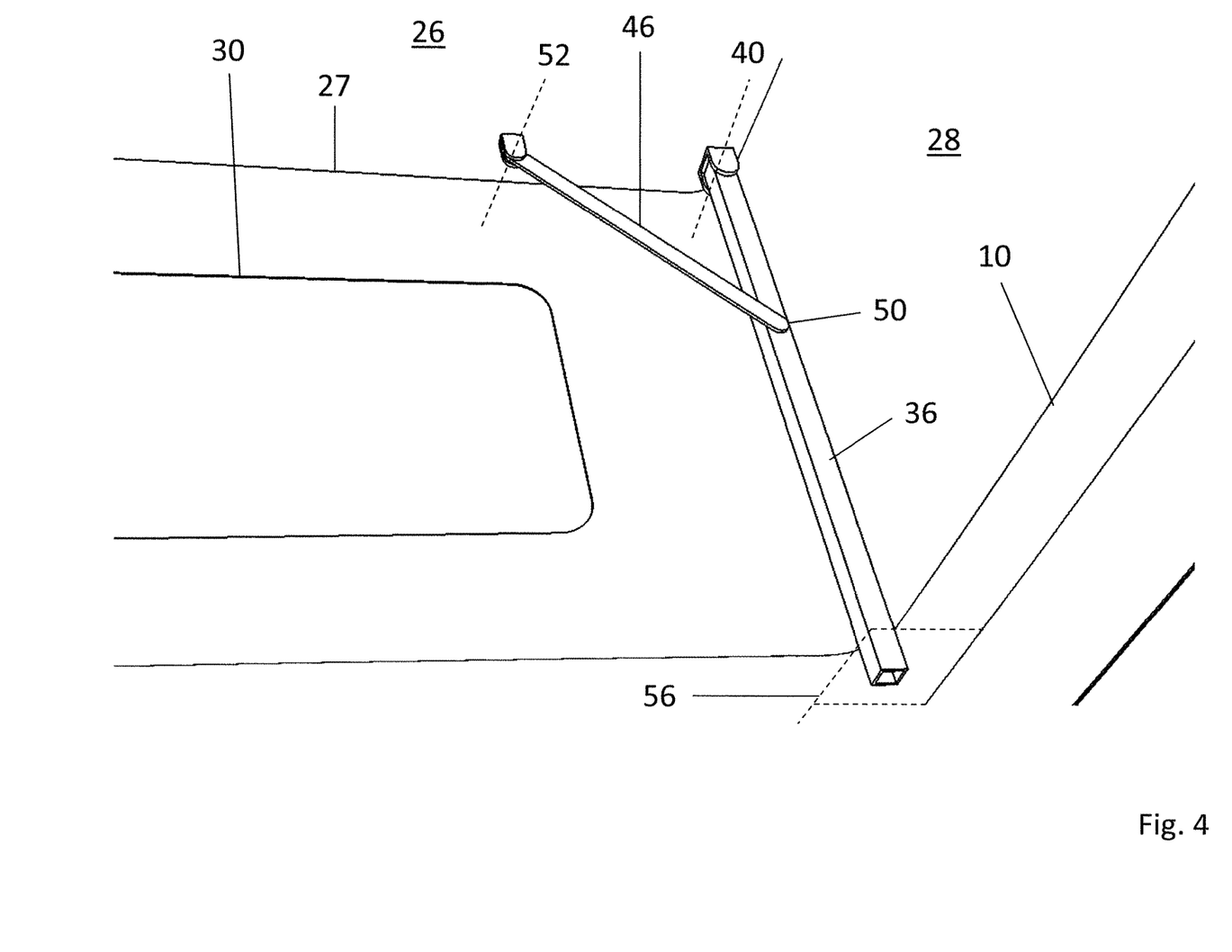
FIG. 4 shows a detailed view of the lifted covering unit from the vehicle interior.

FIG. 4 shows a view of the stud element 36 in the operating position of the covering unit 18. The securing connection 50 between stud element 36 and securing strut 46 is realized as a plug-in connection. The securing connection 50 can, as an alternative, also be realized as a clamp connection, as a screw connection or as other connections, which makes it possible to detachably secure the securing strut at the stud element in order to prevent pivoting of the stud element 36 about the pivot axis 40. The stud element 36, on the bottom, is supported on the base 56 that is fixed relative to the vehicle. The stud elements 32, 34 and 36 are linked to the rigid roof elements 22 and 26 in a corresponding manner.

Figure 5:
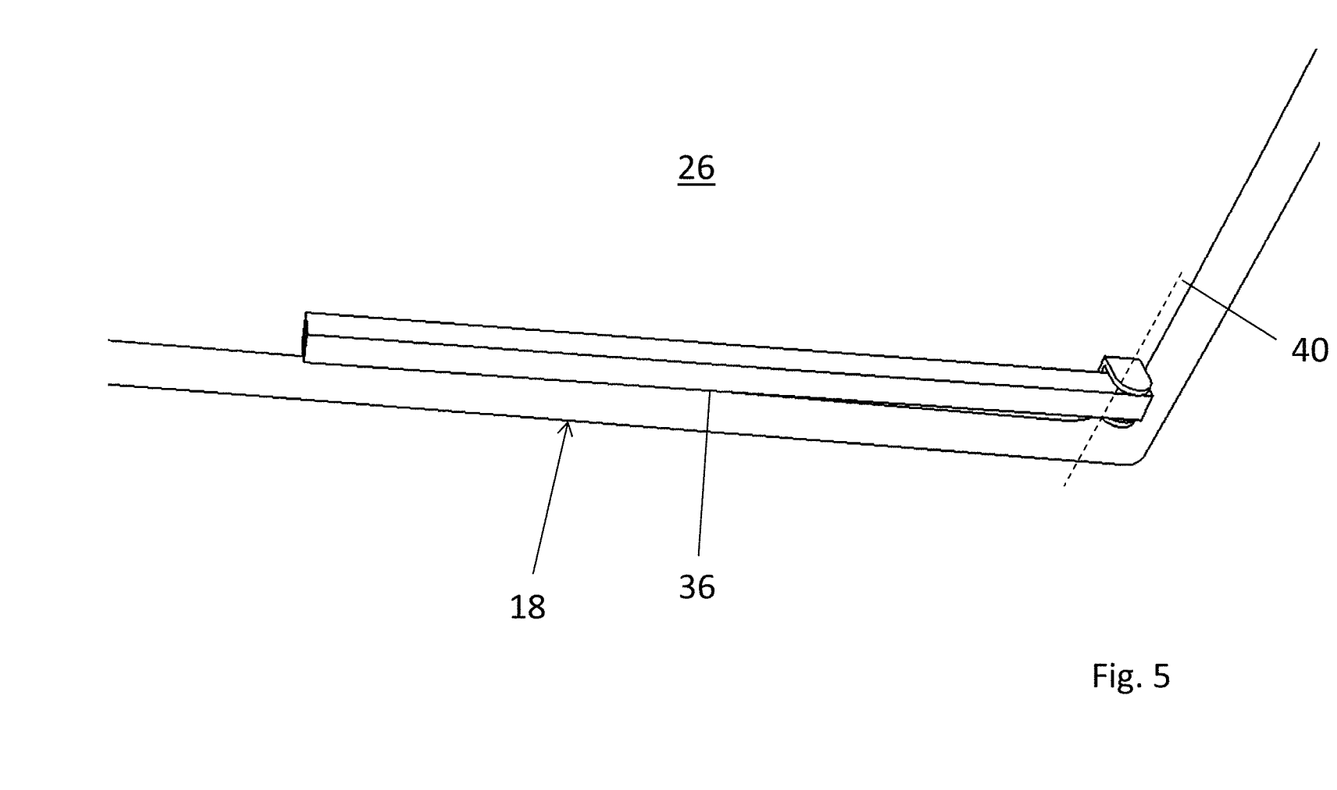
FIG. 5 shows a detailed view of the lowered covering unit from the vehicle interior.

FIG. 5 shows a bottom view of a portion of the covering unit 18 in the lowered closed position. The stud element 36 has been pivoted about the pivot axis 40 against the rigid roof element 26.

Figure 6:
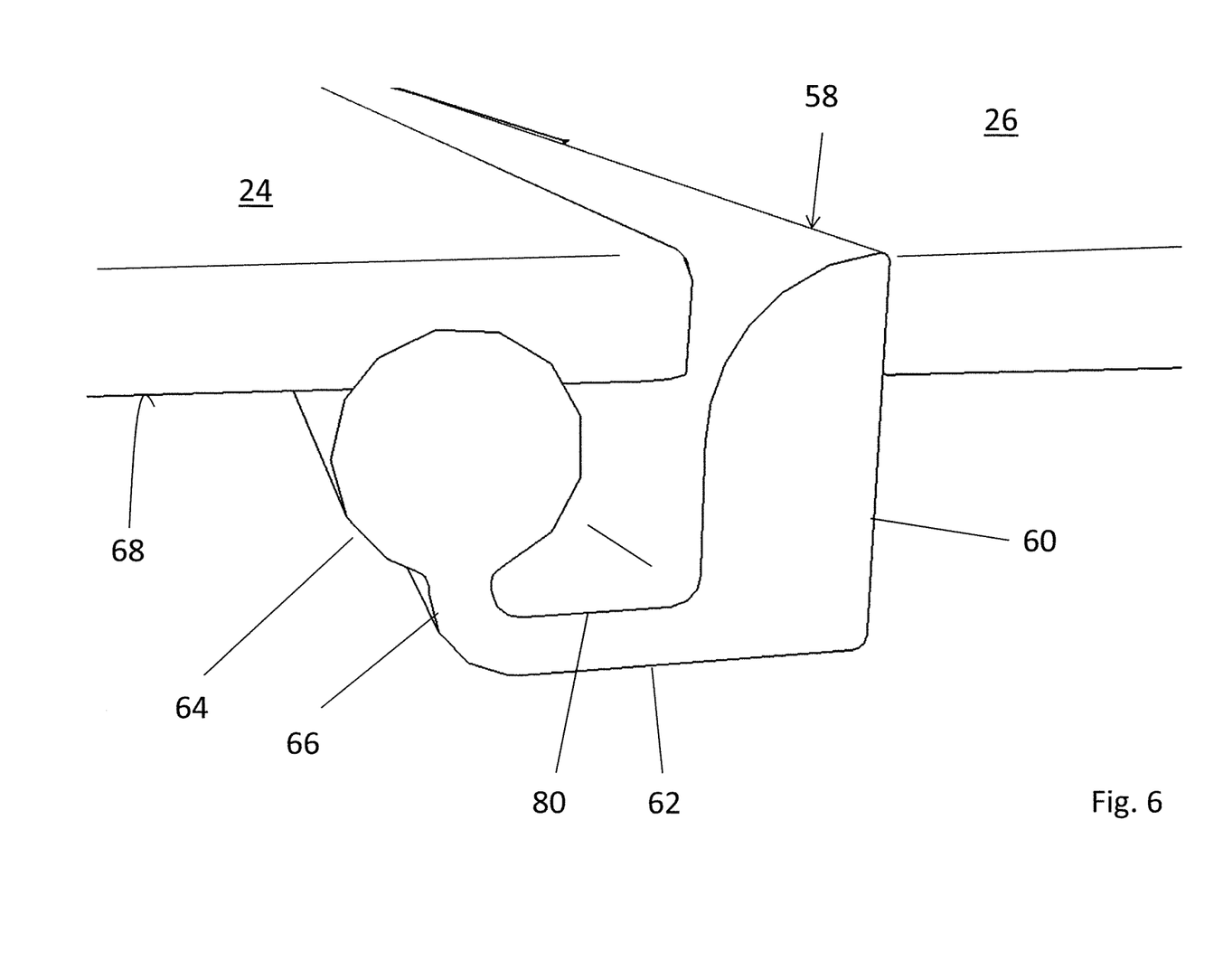
FIG. 6 shows a sectional view of a rigid roof element seal.

FIG. 6 shows a section through the transition zone between rigid roof element 24 and rigid roof element 26. For the covering unit 18 comprises a rigid roof element seal 58 between the two front adjacent rigid roof elements 22 and 24 and a rigid roof element seal 58 between the two rear adjacent rigid roof elements 24 and 26. Rigid roof element 58 includes a seal base 60, which is connected to rigid roof element 26 in a fixed manner A seal land 62 is arranged at the end of the seal base 60 on the opposite side of the arrangement region between the rigid roof element seal 58 and rigid roof element 26. Said seal land 62 is at right angles with the seal base 60 and carries a seal head 64 at its end on the opposite side of the seal base 60. The seal head 64 vertically sits on the seal land 62 via a seal head base 66. The seal base 60, the seal land 62 and the seal head 64 together limit a water channel 80. Rigid roof element 24 rests on the seal head 64 via an abutment surface 68. In other words, the rigid roof element seal 58 reaches below rigid roof element 24.

Figure 7:
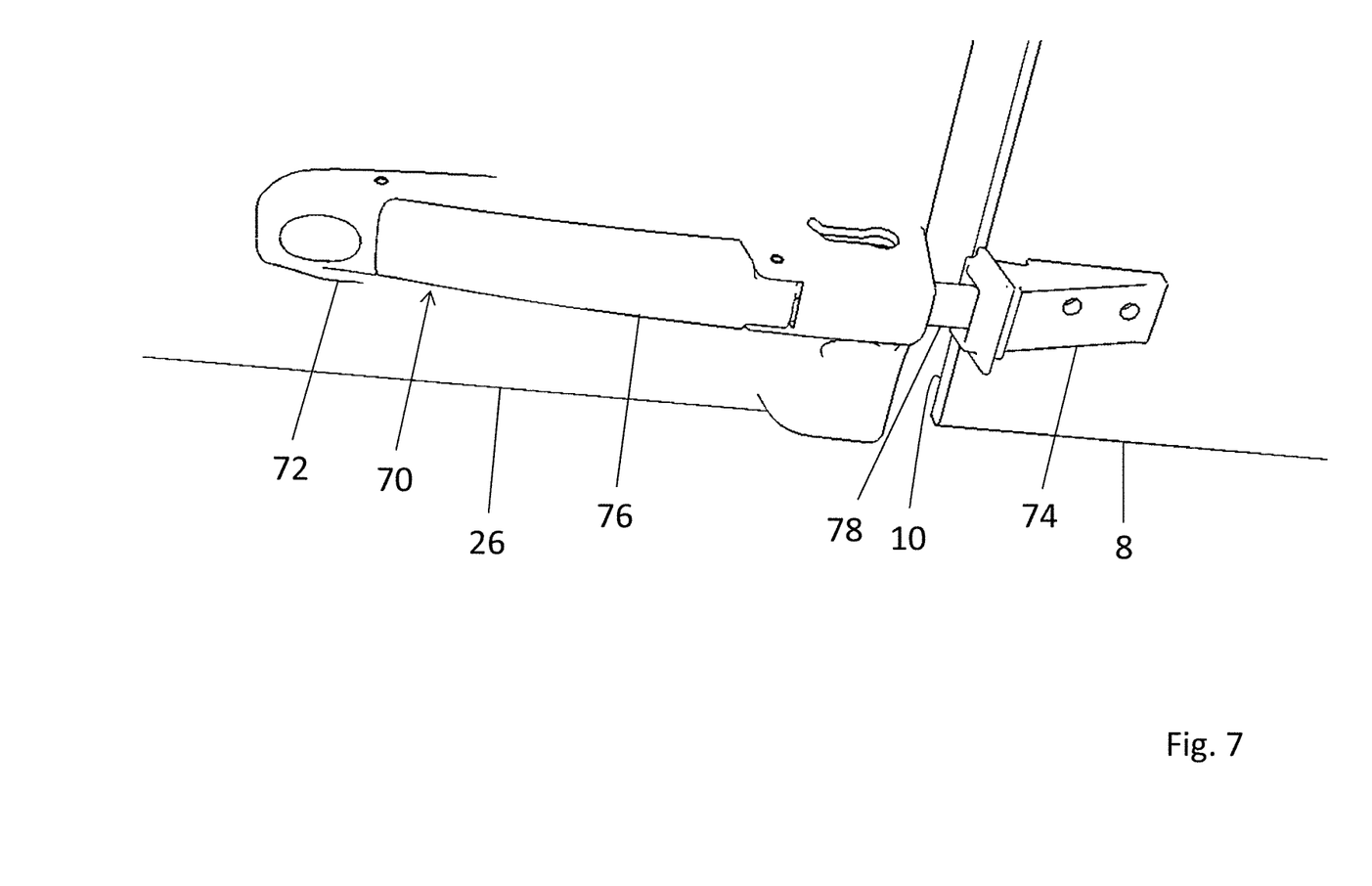
FIG. 7 shows a view of a locking element from a vehicle interior.

FIG. 7 shows a locking element 70 of the vehicle roof 6 for securing the covering unit 18 at the roof portion 8 that is fixed relative to the vehicle. The locking element 70 comprises a base 72 that is fixed relative to the covering unit and a counterpart 74 that is fixed relative to the roof portion. Using a lever 76, which is articulated to the base 72, a safety catch 78 can be made to engage with and come out of engagement with the counterpart 74, whereby the covering unit 18 is secured at the roof portions 8 that are fixed relative to the vehicle or can be released as against the same.

LIST OF REFERENCE NUMERALS 2 motor vehicle
3 car body
4 shoulder line
6 vehicle roof
8 roof portion
10 roof opening
12 front seat region
14 rear bench seat region
16 storage compartment region
18 covering unit
22 rigid roof element
24 rigid roof element
26 rigid roof element
27 groove
28 fabric jacket
30 viewing portion
32 stud element
34 stud element
36 stud element
38 stud element
40 pivot axis
42 securing strut
46 securing strut
48 securing strut
50 securing connection
52 pivot axis
54 roof opening seal
56 base
58 rigid roof element seal
60 seal base
62 seal land
64 seal head
66 seal head base
68 abutment surface
70 locking element
72 base
74 counterpart
76 lever
78 safety catch
80 water channel
A A-pillar
B B-pillar
C C-pillar
D D-pillar

The invention claimed is:

1. A motor vehicle having a vehicle roof, comprising a roof opening limited by roof portions that are fixed relative to the vehicle and a covering unit that comprises at least one rigid roof element and that can be displaced between a lifted operating position, in which the at least one rigid roof element is in lifted position as compared to the roof portions that are fixed relative to the vehicle, and a lowered closed position, in which the at least one rigid roof element closes the roof opening, stud elements, which support the covering unit in the operating position, being articulated to the covering unit so as to be pivotable, and each of the stud elements, in the operating position, spanning a right angle together with a plane that is defined by the at least one rigid roof element so that the covering unit can be set down, in the manner of a table, on bases that are fixed relative to the vehicle, wherein the covering unit comprises at least one securing element in order to lock the stud elements in the operating position, and in that the vehicle roof comprises a fabric jacket that can be spanned between the at least one rigid roof element and the roof portions that are fixed relative to the vehicle and is fastened in a water channel of the roof portions that are fixed relative to the vehicle.

2. The motor vehicle according to claim 1, wherein the securing element is a securing strut that is articulated to the at least one rigid roof element and via a securing connection, is detachably connected to at least one of the stud elements.

3. The motor vehicle according to claim 1, wherein the covering unit comprises three rigid roof elements that are arranged one behind the other in the longitudinal direction of the roof.

4. The motor vehicle according to claim 1, wherein the covering unit comprises at least four stud elements each stud element arranged in a separate corner region of the covering unit.

5. The motor vehicle according to claim 1, wherein the covering unit comprises at least four stud elements per rigid roof element, each stud element arranged in a separate corner region of the respective rigid roof element.

6. The motor vehicle according to claim 1, wherein the vehicle roof comprises a roof opening seal that is arranged circumferentially at the edge of the vehicle roof on the side of the roof opening.

7. The motor vehicle according to claim 1, wherein the covering unit includes rigid roof element seals between adjacent rigid roof elements.

8. The motor vehicle according to claim 1, wherein the fabric jacket is fastened in a groove of the at least one rigid roof element.

9. The motor vehicle according to claim 1, wherein the pivot axes of the stud elements run in a transverse direction of the vehicle.

10. The motor vehicle according to claim 2, wherein the pivot axes of the securing struts run in a transverse direction of the vehicle.

11. The motor vehicle according to claim 2, wherein the securing connection is selected from the group consisting of a plug-in connection, a clamp connection and a screw connection.

12. The motor vehicle according to claim 1, wherein one securing element is assigned to each stud element.

13. The motor vehicle according to claim 1, wherein the vehicle roof comprises at least one locking element for securing the covering unit at at least one roof portion that is fixed relative to the vehicle.

* * * * *